(12) United States Patent  
Flanigan

(10) Patent No.: US 8,708,389 B2  
(45) Date of Patent: Apr. 29, 2014

(54) EXTENDABLE SUPPORT DEVICE UTILIZED WITH A CARGO BED

(76) Inventor: Terrence Flanigan, Warren, OH (US)

(*) Notice: Subject to any disclaimer, the term of this patent is extended or adjusted under 35 U.S.C. 154(b) by 101 days.

(21) Appl. No.: 13/209,413

(22) Filed: Aug. 14, 2011

(65) Prior Publication Data

US 2013/0037587 A1 Feb. 14, 2013

(51) Int. Cl.
B60P 3/40 (2006.01)
F41C 27/00 (2006.01)

(52) U.S. Cl.
USPC ............. 296/26.09; 296/26.08; 42/94

(58) Field of Classification Search
USPC .......... 296/26.1, 65.01, 26.08, 26.11, 186.4, 296/189.11, 190.11, 169, 26.09
See application file for complete search history.

(56) References Cited

U.S. PATENT DOCUMENTS

| | | | | |
|---|---|---|---|---|
| 5,458,389 A * | 10/1995 | Young | | 296/26.08 |
| 5,472,180 A * | 12/1995 | Bent | | 269/99 |
| 5,615,813 A * | 4/1997 | Ouellette | | 224/405 |
| 5,938,092 A * | 8/1999 | Johnson | | 224/521 |
| 5,950,890 A * | 9/1999 | Darby | | 224/402 |
| 6,237,377 B1 * | 5/2001 | Vasquez, Sr. | | 70/237 |
| 7,243,966 B1 * | 7/2007 | Sheldon | | 296/26.08 |
| 7,536,820 B2 * | 5/2009 | Wade et al. | | 42/94 |
| 2003/0201657 A1 * | 10/2003 | Whiteford et al. | | 296/26.08 |
| 2009/0295182 A1 * | 12/2009 | Segeren et al. | | 296/26.11 |

* cited by examiner

Primary Examiner — Glenn Dayoan
Assistant Examiner — Sunsurraye Westbrook
(74) Attorney, Agent, or Firm — The Law Office of Jerry D. Haynes

(57) ABSTRACT

The present invention is an extendable support device utilized with a pick-up truck that includes a cargo bed with a back that includes a trailer hitch, an adjustable horizontal member, an adjustable vertical member and an adjustable width member. There is also a pair of brake lights disposed on a pair of vertical members of the adjustable width member and a pair of signal lights disposed on a pair of vertical members of the adjustable width member.

3 Claims, 2 Drawing Sheets

EXTENDABLE SUPPORT DEVICE UTILIZED WITH A CARGO BED

TECHNICAL FIELD & BACKGROUND

Frequently users must buy a trailer or rent a truck when hauling loads substantially longer than conventional pick-up truck beds. Traditional pick-up trucks offer limited alternatives when it comes to adjustable and extendable cargo bed lengths.

The present invention generally relates to an extendable support device. More specifically, the invention is an extendable support device for a cargo bed of a pick-up truck.

It is an object of the invention to provide a user with an extendable support mechanism for a truck cargo bed that extends the length of a truck cargo bed.

It is an object of the invention to provide a user with an adjustable and extendable support mechanism for a truck cargo bed that extends the length of a truck cargo bed for a truck such as a pick-up truck.

What's really needed is an extendable support mechanism for a truck cargo bed that extends the length of a truck cargo bed and an adjustable and extendable support mechanism for a truck cargo bed that extends the length of a truck cargo bed for a truck such as a pick-up truck.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is utilized repeatedly. The phrase generally does not refer to the same embodiment, however, it may. The terms "comprising", "having" and "including" are synonymous, unless the context dictates otherwise.

Figure 1A:
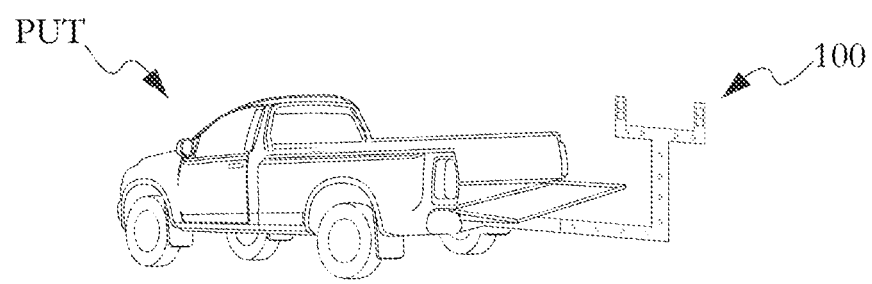
FIG. 1A illustrates an environmental side rear perspective view of an extendable support device, in accordance with one embodiment of the present invention.

FIG. 1A illustrates an environmental side rear perspective view of an extendable support device 100, in accordance with one embodiment of the present invention.

The extendable support device 100 is typically utilized to extend the cargo truck bed of a pick-up truck PUT, although the extendible support device 100 can be utilized with other suitable vehicles and cargo truck beds as well. The extendable support device 100 can be extended up to 5 feet, although the extendable support device 100 is extendable to other suitable lengths as well.

Figure 1B:
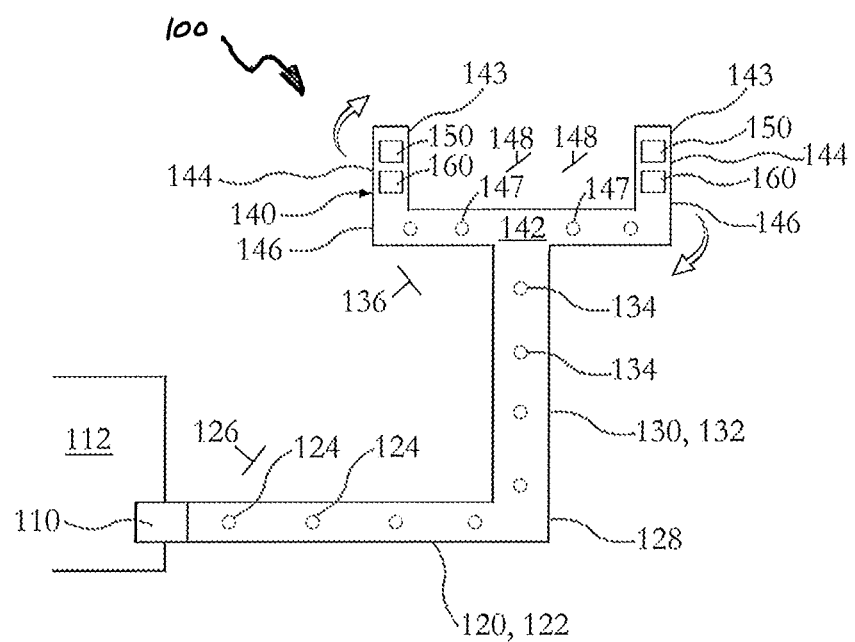
FIG. 1B illustrates a side perspective view of an extendable support device, in accordance with one embodiment of the present invention.

FIG. 1B illustrates a side perspective view of an extendable support device 100, in accordance with one embodiment of the present invention. The extendable support device includes a trailer hitch 110, an adjustable horizontal member 120, an adjustable vertical member 130, an adjustable width member 140, a pair of brake lights 150 and a pair of turn signals 160.

The trailer hitch 110 is disposed on the back of the cargo bed 112 of the pick-up truck PUT and receives the adjustable horizontal member 120 and can be any suitable type of trailer hitch. The adjustable horizontal member 120 is made of square metal tubing 122 and has a plurality of apertures 124 to accommodate a pin 126 that can be utilized to secure the adjustable horizontal member 120 in one of a variety of lengths desired by the user. The adjustable horizontal member 120 can also be made of other suitable types of tubing or have any other suitable type of shape. The adjustable vertical member 130 is also made of square metal tubing 132 and has a plurality of apertures 134 to accommodate a pin 136 that can be utilized to secure the adjustable vertical member 130 in one of a variety of heights desired by the user. The adjustable vertical member 130 is attached to the distal end 128 of the horizontal member 120. The adjustable vertical member 130 can also be made of other suitable types of tubing or have any other suitable type of shape.

The adjustable width member 140 is made of square metal tubing and includes a horizontal base 142 and a pair of vertical members 144 perpendicularly attached at the ends 146 of the horizontal base 142. There is a plurality of apertures 147 disposed on the horizontal base 142 allowing for the width to be adjusted as desired with a pair of pins 148 that can be utilized to secure the horizontal base 142 in one of a variety of widths desired by the user. The adjustable width member 140 is U-shaped but can also be V-shaped with the pair of vertical members 144 and horizontal base 142 being oriented to form the V-shape. The adjustable width member 140 can also be made of other suitable types of tubing or have any other suitable type of shape. The adjustable width member 140 is parallel to the back of the cargo bed, although the adjustable width member 140 is turned to illustrate the features of the extendible support device 100.

The pair of brake lights 150 are an optional feature and are disposed on the top portion 143 of the pair of vertical members 144 and can be any type of suitable pair of brake lights. The pair of turn signals 160 are also an optional feature and are also disposed on the top portion 143 of the pair of vertical members 144 and can be any type of suitable pair of turn signals.

The extendable support device includes an extendable, square tube base frame with an additional extendable, intersecting V-shaped or U-shaped vertical frame. The horizontal base frame attaches directly to the trailer hitch and is designed to extend up to 5 feet intersecting the base frame at the outermost point with the arms facing the truck bed. The extendable support device is easy to operate and the user simply loads the cargo onto the truck bed, utilizing the base or topmost portion of the extendable support device as support for any contents or cargo which exceeds the bed length, extending the frames when needed. The extendable support device is especially useful and effective for pick-up truck and pick-up truck accessories manufacturers as well as the everyday pick-up truck user.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A method of extending a cargo bed of a truck comprising the steps of:
    a. attaching an adjustable horizontal member to a trailer hitch extending from the truck, where the adjustable horizontal member includes a first plurality of apertures to accommodate a first pin that is utilized to secure said adjustable horizontal member at a length received by said trailer hitch;
    b. attaching an adjustable vertical member to said distal end of said adjustable horizontal member, where the adjustable vertical member includes a second plurality of apertures to accommodate a second pin, where the second pin secures said adjustable vertical member at a height;
    c. attaching an adjustable width member to the adjustable vertical member where the adjustable width member includes a horizontal base and a pair of vertical members perpendicularly attached at said ends of said horizontal base with a third plurality of apertures to accommodate a third pin and a fourth pin that is utilized to secure said adjustable vertical member at a width, where said adjustable width member is positioned parallel to the cargo bed of the truck; and
    d. disposing a pair of signal lights on said pair of vertical members of said adjustable width member.

2. The method according to claim 1, further including the step of disposing said trailer hitch on said back of cargo bed.

3. The method according to claim 1, further including the step of disposing a pair of brake lights on said pair of vertical members of said adjustable width member.

\* \* \* \* \*